May 1, 1956 J. WYNSTRA 2,743,658
LAWN EDGER AND TRIMMER
Filed Jan. 14, 1952
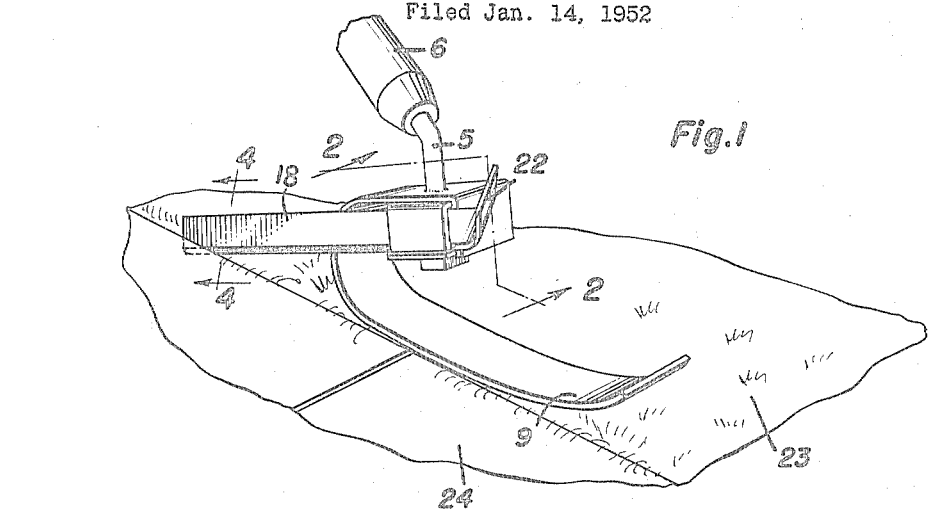
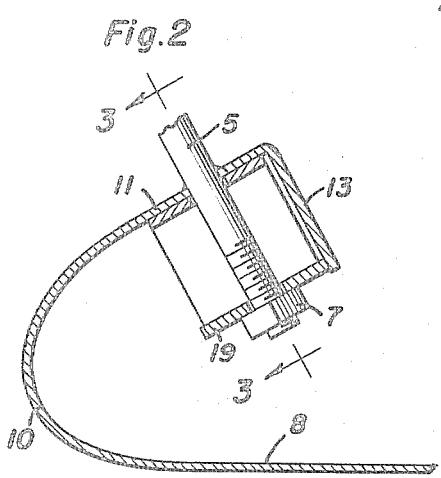
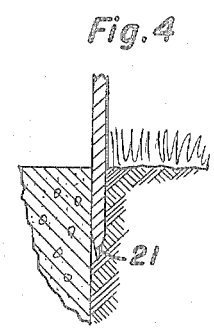
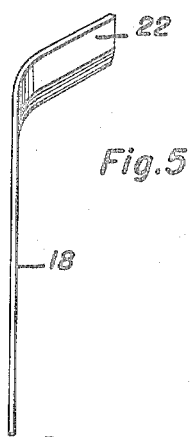
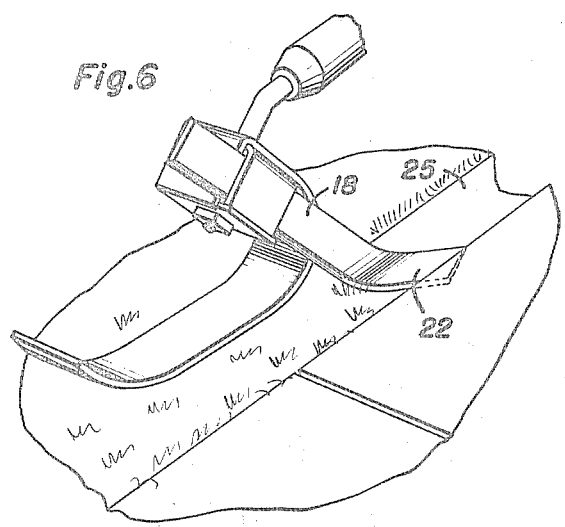
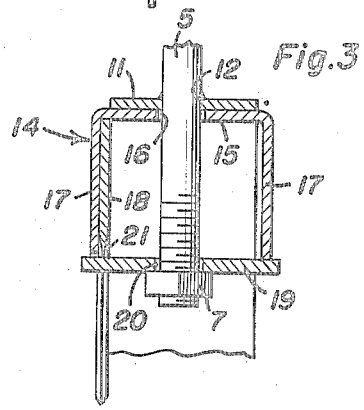
John Wynstra
INVENTOR.

United States Patent Office 2,743,658
Patented May 1, 1956

2,743,658

LAWN EDGER AND TRIMMER

John Wynstra, Lynden, Wash.

Application January 14, 1952, Serial No. 266,301

4 Claims. (Cl. 97—227)

The present invention relates to new and useful improvements in lawn edgers and more particularly to a hand tool of this type for trimming a lawn at the edges of a walk and at the edges of a flower bed and also for channeling the edges of a lawn adjacent the walk.

An important object of the invention is to provide a novel runner and blade holder construction in which the runner is fixed to a handle and the blade holder clamped to the runner by a clamping plate held against the holder by a nut threaded on the handle and arranged whereby the blade may be clamped in the holder at either side of the runner.

Another object is to provide a blade having a straight trimming end and a laterally curved channeling end selectively brought into cutting position by reversing the blade in the holder.

A further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the straight end of the blade in trimming position at the edge of a walk.

Figure 2 is an enlarged vertical sectional view taken on a line 2—2 of Figure 1;

Figure 3 is a transverse sectional view of the blade holder taken on a line 3—3 of Figure 2;

Figure 4 is an enlarged transverse sectional view of the blade taken on a line 4—4 of Figure 1.

Figure 5 is a plan view of the back edge of the blade, and

Figure 6 is a perspective view showing the blade reversed for channeling the edge of a lawn.

Referring now to the drawings in detail, wherein for the purpose of illustration I have disclosed a preferred embodiment of my invention, the numeral 5 designates the metal tang of a handle 6, the tang being curved downwardly from the longitudinal axis of the handle and is threaded at its lower front end to receive a nut 7.

A rigid strap metal runner 8 has an upwardly curved front end 9 and an upwardly curved heel portion 10 forming a forwardly extending top 11 having an opening 12 through which the tang 5 is inserted and welded thereto at right angles to the plane of the top. A flange 13 extends downwardly at the front end of top 11 to close the front of an inverted U-shaped blade holder 14 which has its bight portion 15 forming a top positioned under top 11 and formed with an opening 16 to slidably receive tang 5 for movement vertically thereon.

The opening 16 is of sufficiently increased diameter to permit limited lateral movement of the holder 14 so that its parallel sides 17 are positioned outwardly beyond the side edges of the heel portion of runner 8 as well as beyond the side edges of flange 13 to provide clearance to receive a blade 18 positioned inwardly of the holder against either side thereof and against the adjacent edge of the heel portion 10 and the adjacent edge of flange 13. A clamping plate 19 is formed with a central opening 20 to receive tang 5 for adjustment thereon and is tightened upwardly in bridging relation with the lower ends of U-shaped blade holder 14 by the nut 7. The blade 18 is of a width slightly greater than the height of the sides 17 of the blade holder, as shown in Figure 3, whereby the back edge of the blade is clamped against the underside of the holder by the clamping plate 19 and the blade is held from twisting by reason of its engagement against the inner faces of sides 17 and against the side edges of heel portion 10 and flange 13 of the runner.

The blade 18 is bevelled at one longitudinal edge to form a cutting edge 21 and one end of blade is curved laterally toward one side to form a channeling member 22.

In using the tool for trimming the edge of a walk, as shown in Figure 1, the blade is clamped in the holder 14 at one side of the runner 8 and in a rearwardly sloping position behind the heel portion 10 of the runner. The runner 8 is then pushed forwardly on the grass 23 close to the edge of a walk 24 so that the rear end of the blade drags behind the runner. The depth of the blade may be regulated by rocking the runner on its heel portion.

When the edge of the grass is to be channeled as at 25 in Figure 6, the blade 18 is reversed in the holder 14 to slope the laterally curved channeling member 22 rearwardly at one side of the runner.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A lawn edger comprising a runner having an upwardly curved heel portion, a handle fixed to the rear end of the runner, a blade holder mounted on the handle and extending across said heel portion, a blade in the holder, and means clamping the blade in a rearwardly sloping position in the holder selectively at either side of the runner, said runner including a forwardly projecting top at its heel portion and a downwardly projecting flange at the front edge of the top, said blade holder comprising an inverted U-shaped member positioned under the top and behind the flange and including a pair of parallel side portions positioned outwardly beyond the side edges of the runner to selectively position the blade in clamping engagement against the inner side of either of said side portions and against an adjacent edge of the runner and flange, said clamping means comprising a plate detachably secured on the handle in bridging position under the lower side portions of the holder and engaging the lower edges of the U-shaped member to clamp the blade in the holder.

2. A lawn edger comprising a handle including a depending tang, a runner having an upwardly curved front end, a substantially flat, ground engaging portion and an upwardly curved heel portion terminating in a forwardly extending top section, said tang extending through said top section and being rigidly secured thereto, a U-shaped blade holder disposed on the underside of said flat section and including a web extending transversely across said top section and legs depending from said web, said tang extending loosely through said web for limited transverse movement of the holder with respect to the top section and a clamping plate detachably secured to the free end of said tang abutting the free ends of said legs, a terminal flange on said top section closing the front of said holder, said web being wider than said top section, and a blade clamped between one of said legs, an edge of said heel portion and said terminal flange by said clamping plate, said blade extending rearwardly and downwardly behind said heel portion.

3. A lawn edger comprising a handle including a depending tang, a runner having an upwardly curved front end, a substantially flat, ground engaging portion and an upwardly curved heel portion terminating in a forwardly extending top section, said tang extending through said top section and being rigidly secured thereto, a U-shaped blade holder disposed on the underside of said flat section and including a web extending transversely across said top section and legs depending from said web, said tang extending loosely through said web for limited transverse movement of the holder with respect to the top section and a clamping plate detachably secured to the free end of said tang abutting the free ends of said legs, a terminal flange on said top section closing the front of said holder, said web being wider than said top section, and a blade clamped between one of the legs, an edge of said heel portion and said terminal flange by said clamping plate, and said blade having a straight end portion and a laterally projecting end portion reversibly clamped in a rearwardly sloping position behind the runner.

4. A lawn edger comprising a strap metal runner having an upwardly curved and forwardly projecting heel portion overlying and spaced above the runner, a handle fixed to the overlying heel portion of the runner, a U-shaped blade holder secured to the handle under said heel portion of the runner, said blade holder including spaced parallel side portions, a blade in the holder and including a lawn edging portion at one end of the blade and a lawn trimming portion at an opposite end of the blade, and means clamping the blade in a rearwardly sloping reversible posiiton between one side portion of the blade holder and an adjacent side edge of the heel portion of the runner.

References Cited in the file of this patent
UNITED STATES PATENTS

| | | |
|---|---|---|
| 607,273 | Purdy | July 12, 1898 |
| 971,000 | Fleming | Sept. 20, 1910 |
| 1,154,839 | Bigford | Sept. 28, 1915 |
| 1,179,178 | Hall | Apr. 11, 1916 |
| 1,325,014 | Gilson | Dec. 16, 1919 |
| 1,825,146 | Eiermann | Sept. 29, 1931 |